United States Patent [19]

Hines, Jr.

[11] 4,013,196

[45] Mar. 22, 1977

[54] PNEUMATIC DISPENSING APPARATUS FOR FINELY DIVIDED DRY SUBSTANCES

[76] Inventor: Amos Hines, Jr., 506 Franklin St., Forrest City, Ark. 72335

[22] Filed: June 2, 1975

[21] Appl. No.: 582,887

[52] U.S. Cl. ................................ 222/193; 222/200; 222/231; 222/233; 222/414; 302/37; 302/56

[51] Int. Cl.$^2$ ........................................ B65G 53/40

[58] Field of Search .......... 222/231, 228, 201, 233, 222/193, 200, 414; 302/56, 37

[56] References Cited

UNITED STATES PATENTS

| | | | |
|---|---|---|---|
| 339,468 | 4/1886 | Rand | 222/201 |
| 707,992 | 8/1902 | Warner | 302/37 |
| 1,406,233 | 2/1932 | Skeldon | 222/193 X |
| 2,031,820 | 2/1936 | Crawford | 222/231 X |
| 2,533,538 | 12/1950 | Uhrenholdt | 222/231 X |
| 2,771,223 | 11/1956 | Ryan | 222/233 X |
| 3,140,677 | 7/1964 | Fraser | 222/233 X |
| 3,637,135 | 1/1972 | Luderer et al. | 302/56 X |
| 3,824,937 | 7/1974 | Turner et al. | 222/228 X |

*Primary Examiner*—Robert B. Reeves
*Assistant Examiner*—Charles A. Marmor

[57] ABSTRACT

A portable pneumatic dispenser wherein a bulk of finely divided dry substance, such as powdered or granulated industrial and agricultural chemicals, is deposited in a funnel-shaped hopper from which it flows downwardly to a suitable distribution outlet under concurrently acting forces of gravity, suction and agitation.

2 Claims, 9 Drawing Figures

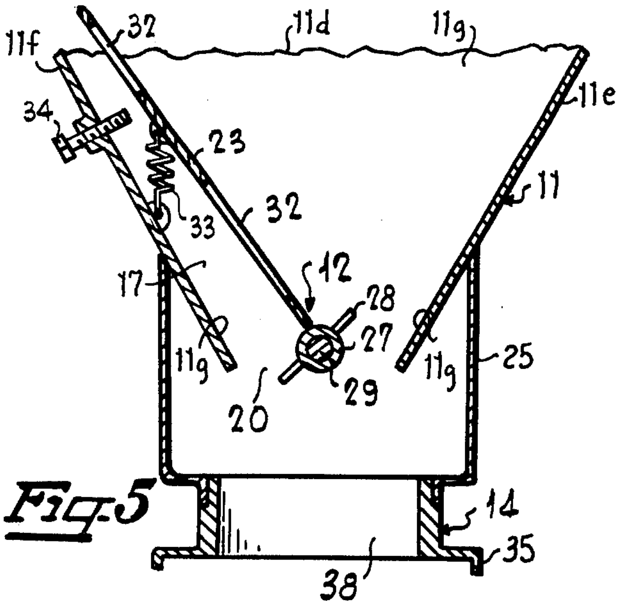
Fig-5
Fig. 6
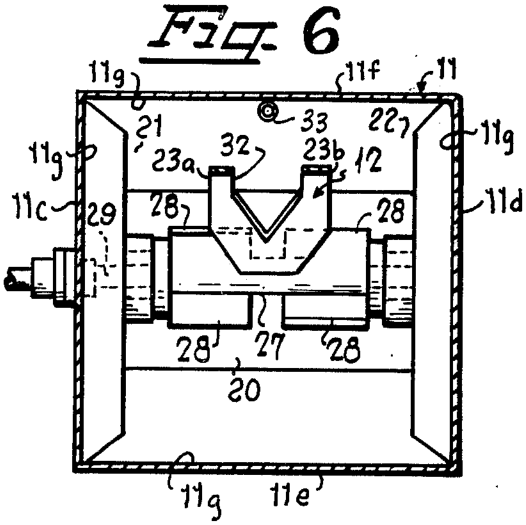
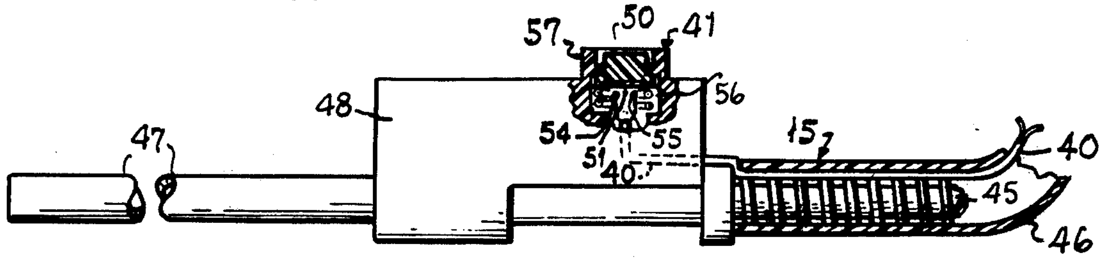
Fig. 7
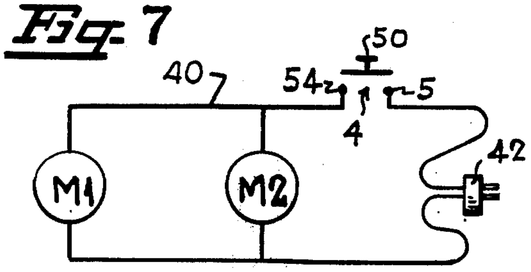
Fig. 8
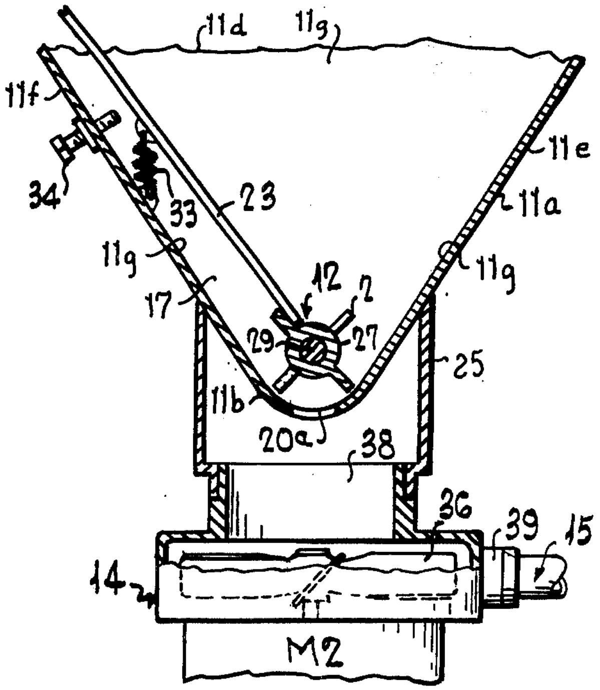
Fig. 9

PNEUMATIC DISPENSING APPARATUS FOR FINELY DIVIDED DRY SUBSTANCES

This invention relates to dispensing apparatus and more especially to a portable assembly of power driven elements which function to disperse and suspend finely divided dry chemicals in a pressurized current of air while being distributed to desired areas.

The conversion of powdered and granulated substances from bulk form into a suitably dispersed state for suspension and distribution has been an everpresent and complex problem due, in part, to the wide variation in composition of the substances. One of the more commonly experienced problems results from the tendency of certain of the substances to arch or bridge the outlet of its dispensing hopper instead of flowing downwardly therethrough solely by gravity. Many types of agitating devices heretofore used for supplementing the gravity flow have been severely limited to narrow ranges of substances, each possessing specific properties in common which requires a different device.

It is therefore an object of this invention to provide an improved apparatus of the class described which is suitable for use in dispensing a wider range of dry bulk treating chemicals.

It is another object of this invention to provide a dry substance dispenser which employs concurrently acting forces of gravity, agitation and suction to promote a substantially uninterrupted flow of the substance at a predetermined rate while being transformed from a bulk to a suspended state in a pressurized current of air.

It is a further object of this invention to provide a dispensing apparatus wherein gravity and suction forces acting upon the bulk substance in a hopper are supplemented by a dasher-type agitating plate oscillatable transversely of the direction of flow of the substance with progressively increasing intensity from the upper to the lower levels of the bulk to thereby correspondingly promote flowability.

It is yet another object of this invention to provide a dispensing apparatus of the class described which is simple in construction, relatively inexpensive to manufacture, and capable of efficient operation under diversified conditions of use.

Some of the objects of invention having been stated, other objects will appear as the description proceeds when taken in connection with the accompanying drawings, in which, FIG. 1 is an elevation of my dry substance dispensing apparatus;

FIG. 5 is an enlarged vertical sectional view taken along line 5—5 in FIG. 1;

FIG. 6 is an enlarged sectional plan view taken along line 6—6 in FIG. 1;

FIG. 7 is an enlarged detail view of the outer end portion of the distribution conduit of the apparatus;

FIG. 8 is a schematic electrical wiring diagram for the motors of the apparatus, and FIG. 9 is an enlarged vertical sectional view similar to FIG. 4, but showing a modified form of invention wherein the dry substance is fed from the supply hopper at a predetermined uniform measured rate.

Figure 1:
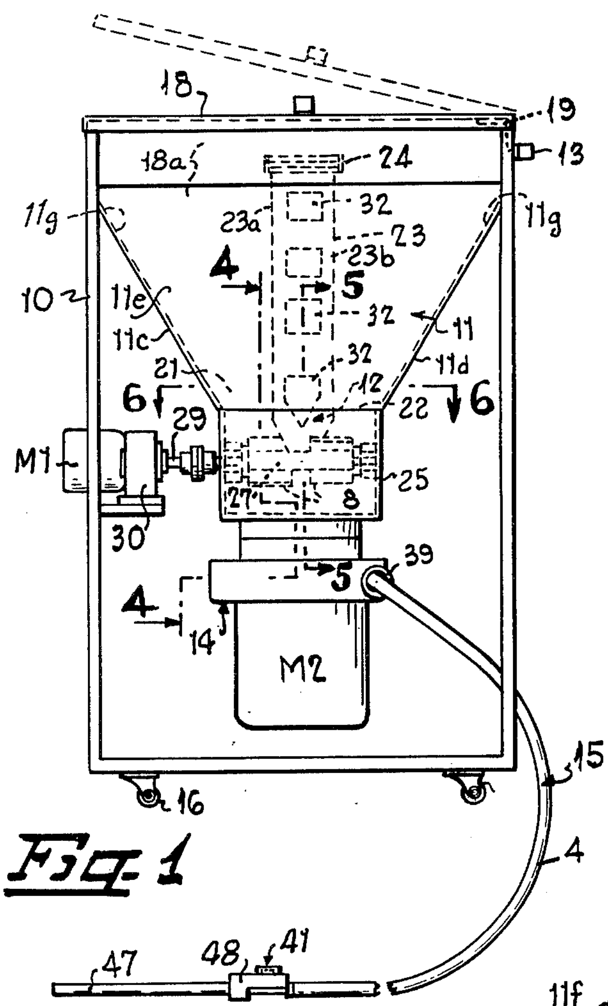
Figure 2:
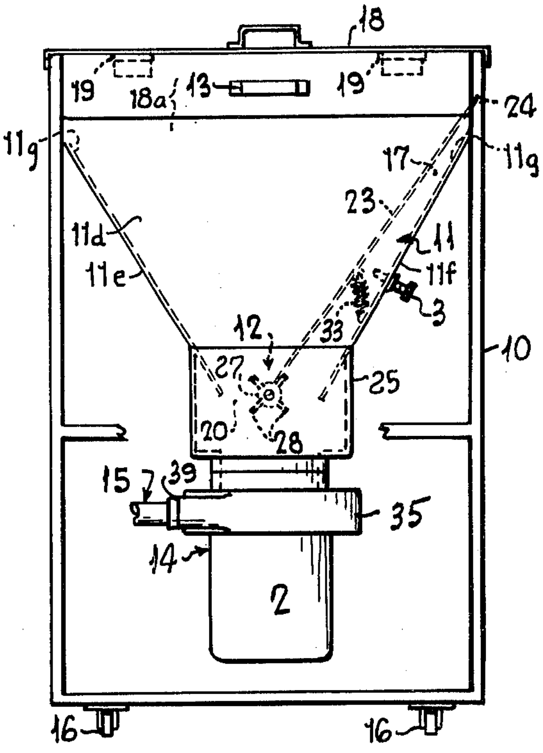
FIG. 2 is an elevation looking at the right-hand side of FIG. 1.
Figure 3:
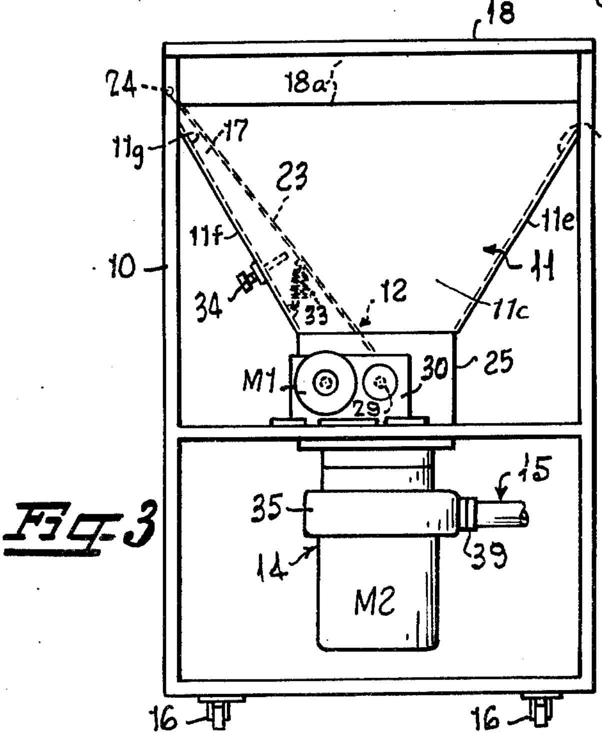
FIG. 3 is an elevation looking at the left-hand side of FIG. 1.
Figure 4:
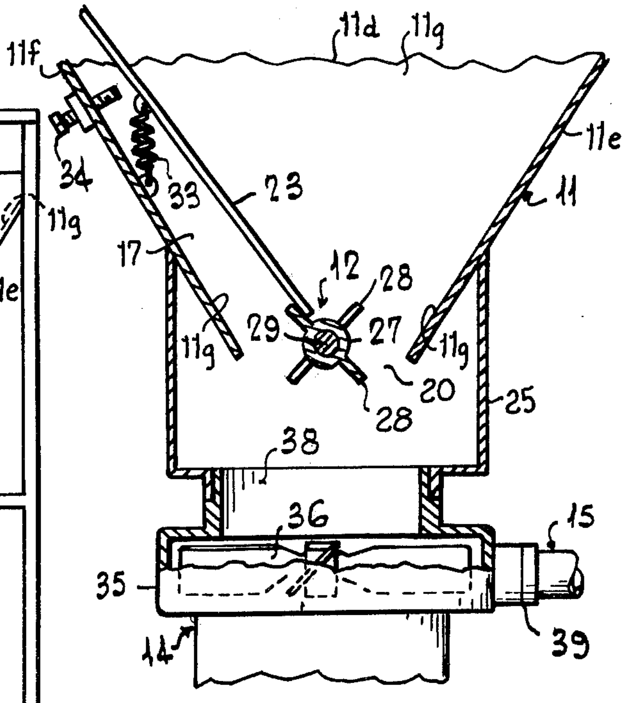
FIG. 4 is an enlarged vertical sectional view taken along line 4—4 in FIG. 1.

Referring to the drawings, the numeral 10 denotes a framework on which is supported my pneumatic dispensing assembly, the principal components of which consist of: an upright hopper unit 11 for holding a supply of dry treating substance in bulk form; unit 12 for agitating the bulk substance within the hopper; combination suction and blower unit 14 for receiving the agitated substance flowing from the hopper unit; and flexible conduit unit 15 for distributing the substance as it is propelled from unit 14. In order to facilitate transportation of the apparatus from place to place, suitable casters 16 are provided at the bottom of the framework 10 and a handle 13 at the top.

More particularly, the hopper unit 11 includes a cover 18 mounted above an upper replenishing opening 18*a* by means of hinges 19, said unit having a relatively small discharge outlet 20 disposed below and axially alined with the replenishing opening. The sidewall of the hopper unit is substantially funnel-shaped and tapers inwardly and downwardly. In the preferred embodiments illustrated in the drawings, the hopper sidewall consists of four trapezoidal panels 11*c*, 11*d*, 11*e* and 11*f* connected to form a truncated or inverted pyramid, the combined inner surfaces of said panels being broadly designated as inner surface 11*g* which terminates at discharge outlet 20.

Agitating unit 12 is composed of: an elongated plate dasher 23 having its upper end hingedly secured as at 24 to the upper inside portion of the hopper said dasher having longitudinally spaced perforations or openings 32 therein; a rotor 27 having radially extending teeth or vanes 28 adapted to engage the lower end of dasher 23; a shaft 29 upon which the rotor is mounted; a speed reducer 30 for driving said shaft; and a motor M1 for driving the reducer. A tension spring 33 yieldingly holds the lower end of the dasher in the path of rotation of the rotor teeth 28 thereby causing the dasher to oscillate about its hinge 24 thereabove at a progressively increasing amplitude from the upper to the lower levels and to correspondingly agitate the bulk substance in the hopper. The cooperative relationship between dasher plate 23 and its spaced openings 32 on one hand, and the proximate inner surface 11*g* of the hopper wall panel 11*f* on the other, is important. Due to the proximity of the oscillatable plate 23 to the surface 11*g*, the dry substance disposed in the intermediate space 17 is subjected to a greater unit pressure as the plate moves toward the surface than when moving in the opposite direction; consequently, the pressurized substance will be more intensely agitated while flowing laterally into hopper spaces 21 and 22 and reversely through plate openings 32 as described later. It will be observed that dasher 23 is located adjacent the inside hopper wall surface or segment of panel 11*f* but separated therefrom by a space 17, said dasher plate being generally disposed at an acute angle relative to said last-named segment.

It will be further observed that the longitudinal outer edges 23*a* and 23*b* of plate 23 are substantially parallel. These outer edges are separated from the laterally disposed inner surfaces 11*g*, 11*g*, of panels 11*c* and 11*c* by spaces 21 and 22 respectively (FIGS. 1 and 6), said spaces establishing communication between the areas of the hopper on opposite faces of the plate 23.

As the dasher plate 23 swings toward space 17 and panel 11*c*, a portion of the dry substance in the space will be expelled laterally into spaces 21 and 22; other portions will pass through openings 32 to the opposite side of the plate; and the remaining portions will be compressed against the inner face of panel 11*c*. As the plate swings in the opposite direction, the substance will return to space 17 from lateral spaces 21 and 22 and through dasher plate openings 32. Thus, the substance will be laterally churned and maintained in a freely flowable condition during each directional stroke of the plate and concurrently with the downward flow to discharge outlet 20.

Since the hopper inner wall surface 11*g* tapers inwardly and downwardly about the vertical common axis of replenishing opening 18*a* and the discharge outlet 20, the cross-sectional area of the downwardly travelling stream of substance will progressively decrease. On the other hand, the length of stroke of the oscillatory dasher plate 23 progressively increases with the decrease of the distance to the outlet 20 thereby producing agitation of increasing intensity. Rotation of the dasher toward the hopper wall surface is limited by adjustable stop 34, and rotation in the opposite direction is yieldingly resisted by tension spring 33 as stated above.

The combination suction and blower unit 14 is composed of: a housing 35; an air propulsion unit such as fan 36; and an electric motor M2 for driving said fan. Housing 35 is provided with a suction inlet 38 communicating with the hopper outlet 20 thereabove by means an intermediate imperforate conduit 25, said housing also having a forced draft outlet 39 to which the distribution unit 15 is connected. Conduit 25 is an imperforate connection between hopper unit 11 and suction fan 35 so as to insure that the air entering suction inlet 38 will first be drawn downwardly through the substance in the hopper thereabove to supplement the forces of gravity and agitation concurrently acting upon the substance.

It is important to note that the suction of unit 14 combines with gravity and with the agitating forces of unit 12 to loosen, disperse, and cause the dry substances to flow downwardly from the hopper unit 11 through suction inlet 38 and into the fan housing 35. While in the housing, the substance becomes suspended in a pressurized current of air and is propelled into the distribution assembly 15.

Motors M1 and M2 are connected in parallel by a suitable electrical circuit 40 (FIG. 8), which circuit includes a push button two point make switch 41 located at the outer end of the distribution unit or assembly 15 whereby the agitating unit 12 and the suction-blower unit 14 may be controlled simultaneously. The switch 41 is composed of a non-conductive button 50 on which is mounted a conductive bar 51 adapted to contact switch terminals 54 and 55 of the circuit 40. Suitable spring means 56 normally hold switch button 50 in open position. A rim or guard 57 is integral with switch box 48 and surrounds the button 50, the upper surface of the button lying approximately in the same plane as the upper edge of the rim so as to prevent accidental closing of the switch. Circuit 40 is provided with a plug 42 adapted to be inserted into a receptacle at the location of use of the apparatus.

The distribution assembly 15 consists of a flexible conduit 45 encased within a hose 46 along with a portion of the circuit 40, said conduit having a spout or nozzle 47 secured to the outer end thereof. The leads of circuit 40 extend from motors M1 and M2, inside the hose 46, and to switch box 48 mounted on spout or nozzle 47 (FIGS. 1 and 7). Assembly 15 is portable, one end thereof being detachably connected to the discharge outlet 39 of unit 14.

FIG. 9 illustrates a modified form of the invention in which a hopper unit 11*a* has an arcuate bottom portion 11*b* concentrically positioned in close proximity to the outer ends of vanes or teeth 28 on rotor 27. An outlet 20*a* is provided in the arcuate portion of the hopper and directly below the rotor. Thus, the agitated substance in the hopper will be positively fed downwardly at a predetermined measured rate into the suction inlet 38 of the suction-blower unit 14.

Although not so limited, the invention is specifically designed for chemically treating and degreasing kitchen exhaust duct systems. Other uses include the spraying of flowers, vegetable plants and trees. A distribution hose 46 of suitable length will permit treatment of large areas without moving the apparatus; however, when movement becomes necessary, very little inconvenience is experienced inasmuch as the apparatus is light in weight, usually about 30 pounds. The push button switch 41 on the nozzle 47 enables the operator to readily control the motors M1 and M2 while manipulating the nozzle in the desired directions.

The toothed rotor 27 not only functions to oscillate dasher 23 as above described, but is also promotes a more uniform flow of the substance from the hopper into the blower unit through outlets 20 and 20*a*. This additional function is made possible by providing two sets of radially extending teeth 28 arranged substantially end-to-end longitudinally of the rotor axis. The teeth of each set are positioned at different radial angles from the the other. Thus the end-to-end arrangement and different angular tooth positions will cause the plate 23 to be oscillated alternately by the respective sets while the substance is also fed alternately by the respective sets into the blower unit 14.

I claim:

1. Portable apparatus for pneumatically distributing finely divided substances such as dry powdered or granulated chemicals, comprising:
   - a hopper (11) for normally supporting a bulk of said substance, said hopper having a restricted discharge opening (20) at its lower portion through which the substance tends to flow by gravity;
   - means (23) movable transversely of said opening (20) for agitating said substance;
   - a housing (35) having an inlet opening (38) a discharge opening (39) and having a fan therein;
   - an imperforate conduit (25) connecting said hopper discharge opening to said housing inlet opening (38);
   - said hopper opening, conduit, fan and housing inlet opening being axially and vertically alined to cause the substance to be conveyed in a rectilinear path from said hopper to said fan under the concurrently acting forces of gravity, agitation and air suction;
   - said hopper (11) comprising a plurality of connected trapezoidal plate sections (11*c*, 11*d*, 11*e*, 11*f*) of an inverted truncated pyramid;
   - said agitating means comprising an elongated dasher plate (23) extending upwardly from said discharge opening in spaced face-to-face position relative to one of said plate sections (11*f*), the opposite lateral edges (23*a*, 23*b*) of said dasher plate being respectively spaced from the proximate faces of the pyramidal trapezoidal plate sections (11*c*, 11*d*) connected to said last-named section (11*f*) to thereby permit the bulk substance to laterally surround the dasher plate;

said plate (25) being provided with longitudinally spaced openings (32) through which said substance is adapted to flow back and forth as the plate oscillates, means (24) for mounting said plate for oscillation about its upper end;

means (33) for yieldingly biasing said plate for movement toward said last-named section (11), and means including said biasing means (33) for oscillating said dasher plate to alternately press the substance on one side thereof against said last-named plate section (11*f*) and to laterally displace the substance on the other side thereof away from the latter plate section, respectively.

2. Portable apparatus for pneumatically distributing finely divided substances such as dry powdered or granulated chemicals, comprising:

a hopper (11) for normally supporting a bulk of said substance, said hopper having a restricted discharge opening (20) at its lower portion through which the substance tends to flow by gravity;

means (23) movable transversely of said opening for agitating said substance;

a blower (35) disposed below said hopper (11) and having a suction inlet opening (38) and a forced draft outlet (39), said inlet opening being axially alined with said hopper discharge opening (20);

an imperforate conduit (25) axially alined with and connecting said openings (20, 38) to cause the air supply for said blower to pass downwardly through the bulk substance in the hopper, through the connecting conduit (25) and through said suction opening (38) in the order named, whereby the substance will be conveyed from said hopper to said blower under the concurrently acting forces of gravity, agitation and air suction;

said hopper (11) comprising a plurality of connected trapezoidal plate sections (11*c*, 11*d*, 11*e*, 11f) of an inverted truncated pyramid;

said agitating means comprising an elongated dasher plate (23) extending upwardly from said discharge opening in a spaced face-to-face position relative to one of said plate sections (11*f*), the opposite lateral edges (23*a*, 23*b*) of said dasher plate being respectively spaced from the proximate faces of the pyramidal trapezoidal plate sections (11*c*, 11*d*) connected to said last named section (11*f*) to thereby permit the bulk substance to laterally surround the dasher plate;

said dasher plate (23) being provided with longitudinally spaced openings (32) through which said substance is adapted to pass back and forth as the plate oscillates, and further comprising:

means (24) for pivotally mounting the upper end of said plate to said last-named section (11*f*);

means (33) for yieldingly biasing said plate for movement about said pivot means toward said last-named section (11), and means including said biasing means (33) for oscillating said dasher plate to alternately press the substance on one side thereof against said last-named plate section (11*f*) and to laterally displace the substance on the other side thereof, respectively;

said oscillating means including a feed roller (27) disposed axially parallel to said pivot means (24) and transversely of said discharge opening (20), said roller having at least two sets of axially elongated and radially disposed teeth (28) engagable with the lower end of said plate, the teeth of each set being spaced apart longitudinally and staggered radially with the teeth of the adjacent set to thereby cause the teeth of the respective sets to alternately engage the plate end in opposition to said biasing means during rotation of said roller.

* * * * *